United States Patent [19]

Mizuhara

[11] Patent Number: 4,679,960
[45] Date of Patent: Jul. 14, 1987

[54] CERAMIC AND METAL BRAZED ARTICLES

[75] Inventor: Howard Mizuhara, Hillsborough, Calif.

[73] Assignee: GTE Products Corporation, Stamford, Conn.

[21] Appl. No.: 695,019

[22] Filed: Jan. 25, 1985

[51] Int. Cl.$^4$ ............................................. B25G 3/34
[52] U.S. Cl. .................................. 403/272; 403/334; 403/404; 228/154
[58] Field of Search ........................ 403/334, 404, 272; 228/154, 122, 124, 132, 120, 138, 139

[56] References Cited

U.S. PATENT DOCUMENTS

| | | | |
|---|---|---|---|
| 2,014,612 | 9/1935 | Borton | 228/132 X |
| 2,972,808 | 2/1961 | Litton | 403/272 X |
| 3,302,961 | 2/1967 | Franklin | 403/272 |
| 3,708,864 | 1/1973 | Patel | 228/154 |

FOREIGN PATENT DOCUMENTS 973983  9/1950  France .................. 228/154

Primary Examiner—Andrew V. Kundrat
Attorney, Agent, or Firm—Donald R. Castle

[57] ABSTRACT

Several articles are disclosed consisting essentially of a ceramic shaft which fits into a recess in a metal shaft. The ceramic shaft is joined to the metal shaft by a ductile active brazing alloy.

10 Claims, 4 Drawing Figures

CERAMIC AND METAL BRAZED ARTICLES

FIELD OF THE INVENTION

This invention relates to an article having a ceramic shaft brazed to a metal shaft by a brazing alloy.

BACKGROUND OF THE INVENTION

There is a need for a reliable method of joining a ceramic shaft to a metal shaft where the ceramic and metal have different thermal expansion properties for use under elevated temperatures, high rotational shear force, and under low to high frequency vibration, especially on a long term basis.

Brazing of ceramic to metal is commonly carried out by application of refractory metallization coating followed by brazing using an oxidation resistant ductile brazing alloy. One drawback is that each ceramic product or composition requires a special refractory paint that must be fired under reducing atmosphere at about 1400° to about 1600° C.

Another common practice is to shrink fit the metal member over the ceramic to subject the ceramic to compressive loading. However, the operating temperature may cause the higher expansion metal member to work loose. Articles which overcome some of the problems heretofore experimental with the prior art methods of joining metallic and ceramic members would be an advancement in the art.

SUMMARY OF THE INVENTION

In accordance with one aspect of this invention there is provided an article consisting essentially of a ceramic shaft having a substantially cylindrical portion and a truncated conical portion, and a metal interlayer with a knife edge and a substantially cylindrical metal shaft with a recess for receiving the ceramic shaft and the interlayer assembly. The interlayer is joined to the ceramic shaft by a ductile active brazing alloy. The outer surface of the interlayer is joined by placing a suitable metal to metal alloy in a groove on the inner lateral surfaces of the recess.

In accordance with another aspect of this invention there is provided an article consisting essentially of a ceramic shaft having a substantially cylindrical portion and a truncated conical portion, with grooves on the inner surface of the shaft for receiving metal keys and a substantially cylindrical metal shaft having a recess for receiving the ceramic shaft. The metal shaft is joined to the ceramic shaft and the metal keys by suitable metal to metal brazing alloy in a groove positioned on the inner lateral surfaces of the recess.

In accordance with another aspect of this invention, there is provided an article consisting essentially of a ceramic shaft having a first and second substantially cylindrical portions and a truncated conical portion positioned between the first and second portions having grooves in which are positioned steel keys and a substantially cylindrical metal shaft with a recess for receiving the ceramic shaft. The metal shaft is joined to the ceramic shaft at the metal keys by means of a suitable metal to metal brazing alloy in a groove positioned on the inner lateral surfaces of the recess, and by a ductile active brazing alloy at the lateral surface of the truncated conical portion of the ceramic shaft and the inner lateral surfaces of the recess.

For joining relatively small parts where the ceramic shaft diameter measures less than about 0.75 inches and the truncated portion measures less than about 0.75 inches, a simple ductile active braze will be ample and one can dispense with the use of keys.

In each of the designs of FIGS. 1, 2, 3, and 4 there is an extended machined chamber between the metal shaft and the end of the ceramic shaft to permit maximum elastic yield of the metal shaft.

DETAILED DESCRIPTION OF THE INVENTION

For a better understanding of the present invention, together with other and further objects, advantages, and capabilities thereof, reference is made to the following disclosure and appended claims in connection with the foregoing description of some of the aspects of the invention.

Figure 1:
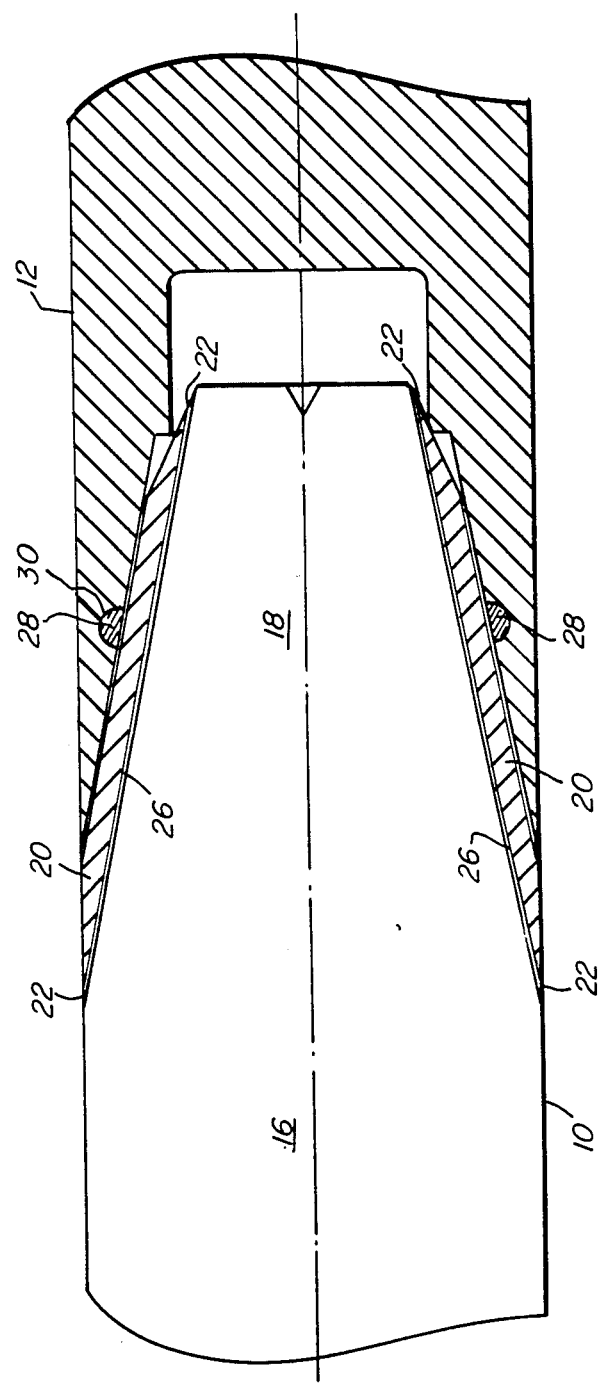
FIG. 1 is a cross section of one aspect of the invention.

In more detail in reference to FIG. 1 there is an article comprising of a ceramic shaft 10 and a metal shaft 12 joined together. The ceramic shaft 10 has a substantially cylindrical portion 16 and a truncated conical portion 18. A metal interlayer 20 having knife edges 22 is joined at its knife edges 22 to the external surface of the conical portion by a ductile active brazing alloy 26. The metal shaft 12 has a substantially cylindrical periphery machined with a recess of substantially identical taper to that of the truncated conical portion 18 of the ceramic shaft 10. The ceramic shaft 10 at the conical portion 18 fits into the recess of the metal shaft 12. The metal shaft 12 has a brazing alloy groove 30 positioned on the inner lateral surface of the recess. In this groove is a ductile brazing alloy ring 28 which joins the interlayer to the metal shaft 12.

The metal shaft 12 is preferably made of steel. The interlayer 20 is preferably made of a low thermal expansion alloy such as 53.8% iron, 29% nickel, 17% cobalt and 0.2% manganese sold under the tradename of Kovar by Westinghouse. Molybdenum foil can also be used for the interlayer. In both instances the coefficient of expansion of the interlayer closely matches that of the ceramic. It is essential that the interlayer 20 have thermal expansion properties close to those of the ceramic shaft 10. The interlayer 20 has a knife edge 22 at each end to minimize the stress at the edge when maximum metal to ceramic stress occurs. The braze between the interlayer 20 and the ceramic shaft 10 is about 2 mils thick. A preferred brazing alloy 26 consists essentially of in percent by weight: from about 69.5% to about 71.5% silver, about 26.5% to about 28.5% copper; and from about 0.25% to about 4% titanium and is supplied by WESGO Division of GTE Products Corporation under the trade name of CUSIL ABA. Brazing between the ceramic shaft 10 and the interlayer 20 is achieved at about 840° C. by about 10 minutes soak under $10^{-5}$ torr. Brazing of the ceramic shaft 10 to the metal shaft 12 is accomplished by snapping a brazing alloy ring 28 into the brazing alloy groove 30. The brazing alloy ring consists essentially of in percent by weight: about 23 percent to about 25 percent copper, about 13 to 15 percent indium, and balance silver and is supplied by WESGO Division of GTE Products Corporation under the trade name of Incusil 15. The entire assembly is brazed in a vertical position at 750° C. under vacuum or under hydrogen. Upon cooling, the ceramic shaft 18 is in compression because the metal expands at the braze temperatures thus the ceramic interlayer 20 moves downwardly.

Figure 2:
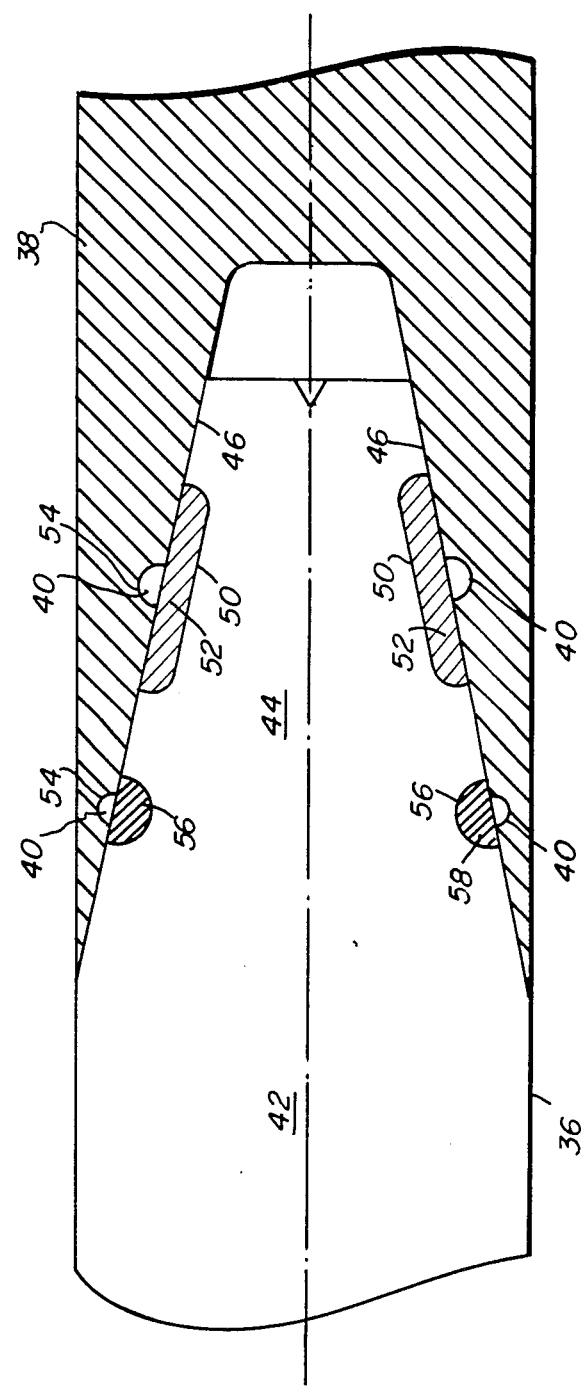
FIG. 2 is a cross section of another aspect of the invention.

With particular reference to FIG. 2 there is shown an article comprising of a ceramic shaft 36 and a metal shaft 38 joined together by a brazing alloy 40. The ceramic shaft 36 has a substantially cylindrical portion 42 and a truncated conical portion 44, an inner surface 46 having keyway retainer grooves 50 in which are positioned metal keys 52. The metal shaft 38 has a substantially cylindrical periphery and is machined with a recess of substantially identical taper to that of the truncated portion 44 to receive the ceramic shaft 36. In the brazing alloy grooves 54 are brazing alloys 40 that join the metal keys 52 to the metal shaft 38. The keys 52 are preferably made of mild steel. Brazing of the keys 52 to the metal shaft 38 results in retainment of the ceramic shaft 36 and also gives a method of transmitting a rotational force from the metal shaft 38 to the ceramic shaft 36. The keys 52, preferably 4 in number, are inserted into the keyway retainer grooves 50 in the ceramic shaft 36. An additionally groove 56 can be machined in the trunicated conical portion 44 to receive a metal retaining ring 58. A brazing alloy 40 can be used to braze the ring 58 to the metal shaft 38. The assembly is vacuum brazed at about 820° C. under about $10^{-5}$ mm Hg in a vertical position. The preferred brazing alloy sold under the tradename of CUSIL by the Wesgo Division of GTE Products Corporation.

Figure 3:
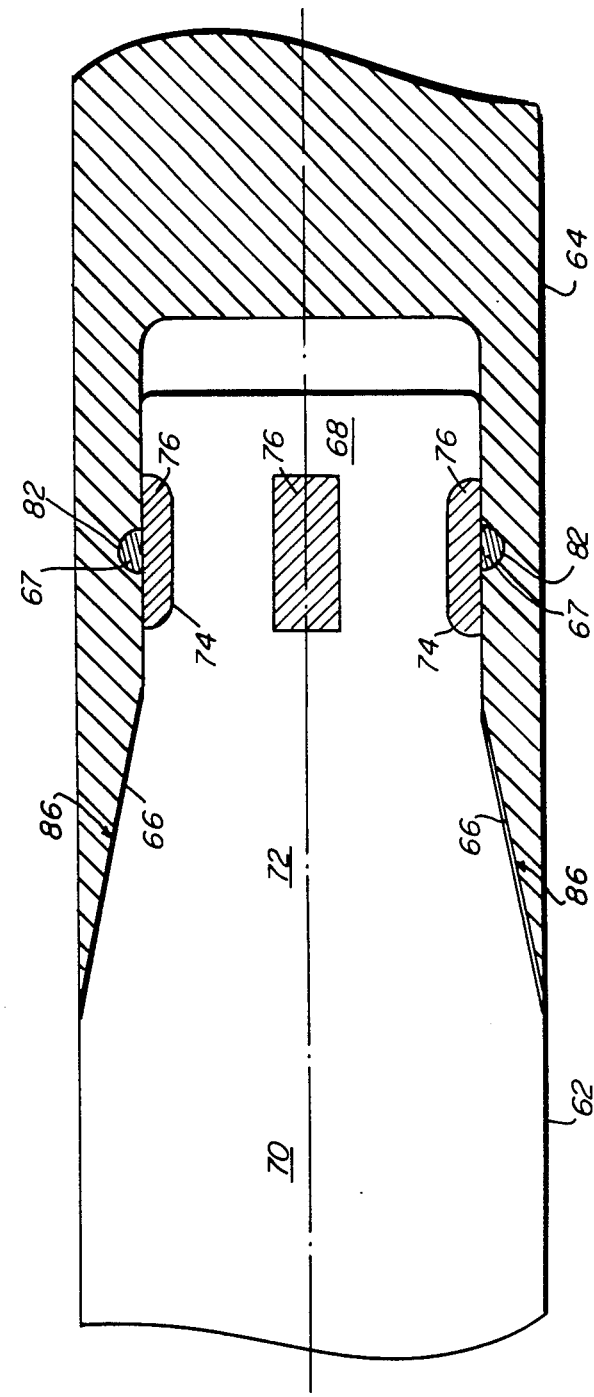
FIG. 3 is a cross section of another aspect of the invention.

With particular reference to FIG. 3 there is shown an article comprising of a ceramic shaft 62 and a metal shaft 64. The ceramic shaft 62 has a first 68 and a second 70 substantially cylindrical portion and a truncated conical portion 72 positioned between the first 68 and the second 70 cylindrical portions. The first portion 68 has keyway retaining grooves 74 in which are positioned metal keys 76. The metal shaft 64 has a substantially cylindrical periphery machined with a recess having internal surfaces substantially matching the external surfaces of the first cylindrical portion 68 and the truncated conical portion 72 of the ceramic shaft 62. The metal shaft 64 has a brazing alloy groove 82 positioned on the inner lateral surface of the portion matching the first cylindrical portion 68 of the ceramic shaft 62. In the groove 82 is a brazing alloy 67 which joins the keys 76 to the metal shaft 64. A suitable braze alloy 67 is Cusil sold by the Wesgo Division of GTE Products Corporation with a nominal composition of 28% copper, 72% silver. A brazing alloy 66 joins the lateral surface 86 of the truncated conical portion 72 of the ceramic shaft 62 to the matching surface 86 of the metal shaft 64. A suitable braze alloy 66 is Cusil ABA sold by the Wesgo Division of GTE Products Corporation with a nominal composition of 27.5% copper, 2% titanium, balance silver.

Figure 4:
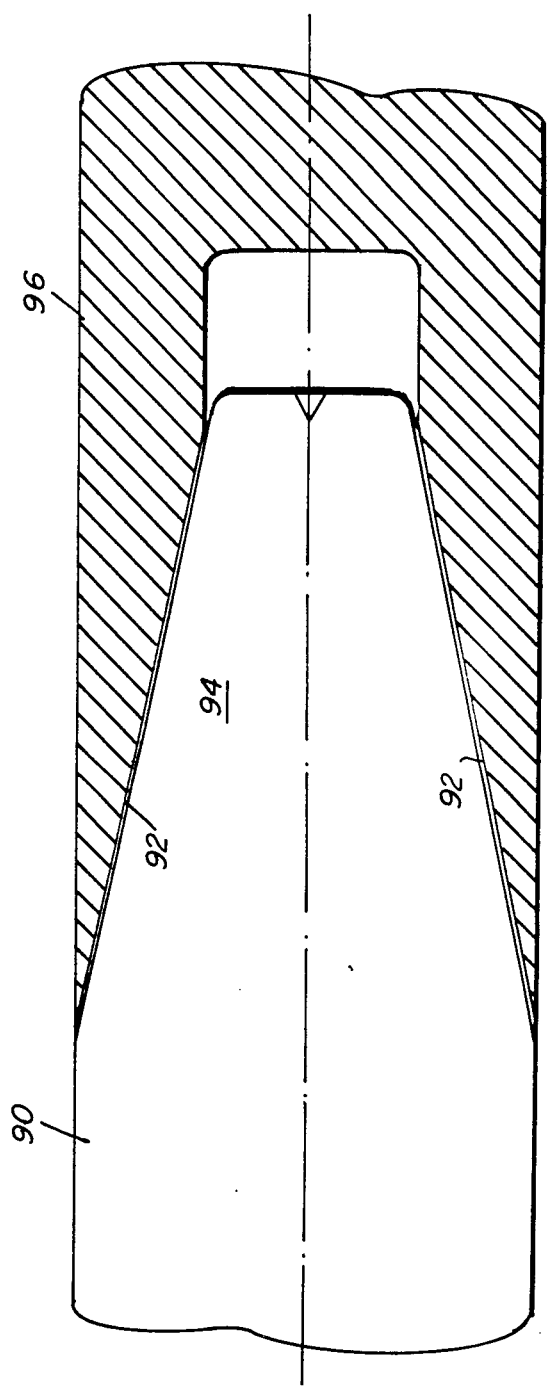
FIG. 4 is a cross section of still another aspect of the invention.

FIG. 4 illustrates an embodiment for joining relatively small parts where the ceramic shaft 90 diameter measures less than about 0.75 inches. A simple ductile active bridge 92 is ample for joining a truncated conical portion 94 to the metal shaft 96. A suitable braze is sold under the tradename Incusil 15 ABA by the Wesgo Division of GTE Products Corporation. The compositional nominal are copper 23.5%, indium 14.5%, titanium 1.25% and silver is balance.

In each of the designs of FIGS. 1, 2, 3, and 4 there is an extended machined chamber between the metal shaft and the end of the ceramic shaft to permit maximum elastic yield of the metal shaft.

While there has been shown and described what are at present considered the preferred embodiments of the invention, it will be obvious to those skilled in the art that various changes and modifications may be made therein without departing from the scope of the invention as defined by the appended claims.

What is claimed is:

1. An article consisting essentially of:
   (a) a ceramic shaft having a truncated conical portion,
   (b) a substantially solid metal shaft having a substantially cylindrical periphery machined with a recess having internal surfaces substantially matching the external surface of said truncated conical portion and with a chamber adjacent said recess
   (c) a ductile active brazing alloy joining the internal surfaces of said truncated conical portion of said ceramic shaft to the matching internal surfaces of said recess of said metal shaft said article having said chamber between the end of said ceramic shaft and said metal shaft.

2. An article according to claim 1 wherein said metal shaft is steel.

3. An article according to claim 1 wherein the ductile brazing alloy consists essentially of in percent by weight: about 58% to 62% silver, about 23% to 25% copper, about 13% to 15% indium, and about 1% to 5% titanium.

4. An article consisting essentially of:
   (a) an assembly consisting essentially of a ceramic shaft having a substantially cylindrical portion and a truncated conical portion adjacent said cylindrical portion and a metal interlayer having a knife edge and a ductile active brazing alloy that joins the lateral surface of said conical portion of said ceramic shaft to said knife edge of said interlayer, and
   (b) a metal shaft having a substantially cylindrical periphery with a recess of substantially identical taper to that of said truncated cone portion of said ceramic shaft to receive said assembly, said metal shaft having a brazing alloy groove positioned on the inner lateral surface of said recess to receive a brazing alloy that joins said assembly to said metal shaft.

5. An article according to claim 4, wherein the ductile active brazing alloy consists essentially of in percent by weight: about 68% to 72% silver, about 26% to 28% copper, and about 1 to 4% titanium.

6. An article consisting essentially of
   (a) a ceramic shaft having a substantially cylindrical portion and a truncated conical portion, and an inner surface having keyway retainer grooves in which are positioned metal keys, and,
   (b) a metal shaft having a substantially cylindrical periphery and machined with a recess of substantially identical taper to that of said truncated conical portion to receive said ceramic shaft, said metal shaft having a brazing alloy groove positioned on the inner lateral surface of said recess, said brazing alloy groove containing a brazing alloy which joins said keys to said metal shaft.

7. An article according to claim 6 wherein said metal shaft is steel.

8. An article consisting essentially of:
(a) a ceramic shaft having a first and a second substantially cylindrical portions and a truncated conical portion positioned intermediate between said first and said second cylindrical portions, said first and said second portions having keyway retainer grooves in which are positioned metal keys,
(b) a metal shaft having a substantially cylindrical periphery machined with a recess of substantially identical taper to that of said first conical portion of said ceramic shaft to receive said ceramic shaft, said metal shaft having brazing alloy grooves positioned on the inner lateral surface of said recess, said brazing alloy grooves receiving a brazing alloy that joins said keys to said metal shaft, and
(c) a ductile active brazing alloy joining the lateral surface of said truncated conical portion of said ceramic shaft to the lateral surfaces of said recess of said metal shaft.

9. An article according to claim 8 wherein said metal shaft is steel.

10. An article according to claim 8 wherein the ductile active brazing alloy consists essentially of in percent by weight about 68% to about 72% silver, about 26% to about 28% copper and about 1% to about 4% by weight of titanium.

* * * * *